United States Patent

Nilsson et al.

(10) Patent No.: US 6,804,505 B1
(45) Date of Patent: Oct. 12, 2004

(54) MOBILE INTERNET ACCESS

(75) Inventors: Patrik Nilsson, Turku (FI); Paul Martlew, Woking (GB); Leena Mattila, Turku (FI); Esa Hoisko, Lieto (FI); Johan Lundström, Pargas (FI)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/566,173

(22) Filed: May 5, 2000

Related U.S. Application Data

(60) Provisional application No. 60/156,148, filed on Sep. 27, 1999.

(30) Foreign Application Priority Data

May 6, 1999 (GB) .............................................. 9910363

(51) Int. Cl.[7] ...................... H04M 11/00; H04M 15/00; H04Q 7/20
(52) U.S. Cl. ...................... 455/406; 455/407; 455/408; 455/423.1; 379/114.28
(58) Field of Search ................................. 455/406, 407, 455/408, 432.1; 379/114.28

(56) References Cited

U.S. PATENT DOCUMENTS

| 5,148,472 | A | * | 9/1992 | Freese et al. ................ 455/408 |
| 5,303,297 | A | * | 4/1994 | Hillis .......................... 455/406 |
| 5,511,113 | A | * | 4/1996 | Tasaki et al. ........... 379/114.28 |
| 5,862,471 | A | * | 1/1999 | Tiedemann et al. .......... 455/406 |
| 5,873,030 | A | * | 2/1999 | Mechling et al. ............ 455/408 |
| 6,047,179 | A | * | 4/2000 | Kirby .......................... 455/432 |
| 6,167,250 | A | * | 12/2000 | Rahman et al. .............. 455/406 |
| 6,195,543 | B1 | * | 2/2001 | Granberg ..................... 455/407 |
| 6,223,042 | B1 | * | 4/2001 | Raffel .......................... 455/455 |
| 6,345,181 | B1 | * | 2/2002 | Janhonen et al. ............ 455/406 |
| 6,345,182 | B1 | * | 2/2002 | Fabritius et al. ............. 455/408 |
| 6,453,030 | B1 | * | 9/2002 | Boutwell et al. ......... 379/114.2 |
| 6,650,886 | B1 | * | 11/2003 | Lundstrom ................... 455/406 |

* cited by examiner

*Primary Examiner*—Lee Nguyen
*Assistant Examiner*—Yuwen Pan

(57) ABSTRACT

A method of determining a total call tariff in respect of a call from a Mobile Station currently registered with a foreign network. A total call tariff request is sent from a charging function of the foreign network to a rating node of the mobile telephone subscriber's home network, the message including a call tariff portion of the foreign network. At the rating node, the total call tariff is determined by applying a multiplying factor to the foreign network's tariff portion. The determined total call tariff is then sent to the charging function of the foreign network.

14 Claims, 5 Drawing Sheets

MOBILE INTERNET ACCESS

This application claims benefit of 60/156,148 filed Sep. 27, 1999.

BACKGROUND OF THE INVENTION

The present invention relates to call tariff determination in mobile telecommunication networks and more particularly to the determination of call tariffs for provision to an access network in respect of a mobile telephone subscriber.

In today's competitive mobile telephone market, in order to attract new customers, operators are operating a diverse range of payment options. In addition to the conventional payment scheme where a subscriber is billed regularly for telephone calls made over a period immediately preceding the issuing of a bill, there is for example the prepaid card schemes where a user purchases a card and then uses a secret number provided on the card to top-up an account maintained by his operator. The user is able to make and receive calls until such time as the balance in his account falls to zero. The account must be topped-up using a new prepaid card before the user can make and receive calls once more. Many new services are also being introduced by mobile telephone operators to attract new customers as well as to maintain their existing customer base. One such service, which is in limited current use, is known as "Advice of Charge" and allows mobile telephone's to be provided with call charge information during the call set-up phase to enable call charges to be computed by the telephone either during or after a call.

In a typical GSM/GPRS mobile telecommunications network, there is present a rating node or Charging Control Node (CCN) which maintains details of the tariffs charged by the operator for the complete range of call options (e.g. home mobile telephone to home mobile telephone, home mobile telephone to other national telephones, international tariffs, etc), and which implements a Service Control Function (SCF). The SCF of the CCN may communicate with a Service Switching Function (SSF) associated with the Mobile Switching Centre (MSC) serving a Mobile Station, in order to transfer tariff determining information in one direction (i.e. from the MSC/SSF to the CCN) and determined tariffs in the other direction.

Providing that a subscriber's telephone is registered with his home network, there is in principle no bar to providing services such as Advice of Charge and to controlling and monitoring in real time prepaid card subscribers and the like, as all the necessary information is available at the home network's CCN (or can be readily obtained by that node). Problems arise however when a mobile telephone subscriber is not at home but rather is registered with some foreign mobile telephone network (the term "access" network is used below to describe the network to which a subscriber is directly connected).

Such a foreign access network should be able to determine real time charging information for a roaming subscriber if prepaid subscribers are to be allowed to roam, or if services such as Advice of Charge are to be available to roaming subscribers. Indeed this may be necessary whenever subscribers have a credit ceiling that must not be exceeded. However, the foreign network SSF does not necessarily know the call tariff to be applied by the subscriber's home network nor does the home network necessarily know the tariff to be applied by the foreign network (it is the home network which has overall control of billing operations for its own subscribers). It is not realistic to expect every charging node in every network to be provided with a comprehensive list of caller tariffs applied by other network operators, as tariffs quickly become outdated and/or operators are not be willing to provide their own call tariffs to their competitors.

One solution to the above problem which has been proposed is to provide every network with one or more so-called "rating nodes" (for example Service Control Functions) which knows the tariffs of the network to which they belong. When a roaming subscriber initiates a call using a foreign network as the access network, the responsible SSF of the access network contacts a rating node of the subscriber's home network to obtain the home network's tariff for the call in question. This tariff is then returned to the SSF of the access network to enable it to calculate real time charging data.

A limitation of this proposed solution is that the rating node of the subscriber's home network does not know the tariff that the foreign network will apply to the call (this information is only provided to the home network after termination of the call). Thus, the real time charging information generated at the SSF of the foreign network will be an estimate, based only upon the tariff of the home network and will not correspond to the actual tariff applied to the call (and upon which the subscriber's telephone bill will be based).

SUMMARY

It is an objective of the present invention to overcome or at least mitigate the above noted disadvantages of existing and currently proposed solution of providing a real time or near real time call charging information to a foreign network which is acting as an access network for a roaming mobile subscriber.

According to a first aspect of the present invention there is provided a method of determining a total call tariff in respect of a call from a Mobile Station currently registered with a foreign network, the method comprising the steps of:

sending a total call tariff request from a charging function of the foreign network to a rating node of the mobile telephone subscriber's home network, said message including a call tariff portion of the foreign network;

at the rating node, determining said total call tariff on the basis of the foreign network tariff portion and a call tariff or charge factor of the home network; and returning the determined total call tariff to the charging function of the foreign network.

Embodiments of the present invention provide a relatively easy and straightforward way of providing total call tariff information to a foreign network, which information represents the true tariff to be used by a subscriber's home network. In these embodiments, the home network retains control of the charging operation and furthermore there is no need for the home network to disclose complete details of its charging formula to the foreign network.

Preferably, the rating node applies a multiplier to the received foreign network's tariff portion in order to determine the total tariff.

Preferably, the sending of said total call tariff request from the charging function of the foreign network is triggered by receipt at the foreign network of an Address Complete Message (ACM) which is a response to the initiation of a call by the Mobile Station. The sending of subsequent call tariff requests may be triggered by receipt at the foreign network of external charging information. More preferably, the determined call tariff is available at the charging function of the foreign network when an Answer Message (ANM) is received at the foreign network.

Preferably, the charging function of the foreign network is a Service Switching Function (SSF). The SSF may be a stand-alone node, or may be co-located with an MSC of the foreign network. Preferably, the rating node of the home network is a Charging Control Node.

More preferably, said ACM and ANM are received by the serving VMSC/SSF.

Preferably, the method of the present invention is implemented using the CAMEL mechanism and the CAMEL Application Part (CAP) protocol.

The present invention is applicable in particular to GSM telecommunications networks, both in respect of circuit switched and packet switched calls. The invention is also applicable to other telecommunications systems including UMTS.

Preferably, said call tariff portion of the foreign network relates in whole or in part to network based number translation services. Preferably, said call tariff or charge factor of the home network relates to subscribed services, subscribed dialled services, and/or charging services.

According to a second aspect of the present invention there is provided apparatus for determining a total call tariff in respect of a call from a mobile telephone subscriber currently registered with a foreign network, the apparatus comprising means for sending a total call tariff request from a charging function of the foreign network to a rating node of the mobile telephone subscriber's home network, the message including a call tariff portion of the foreign network, means for determining at a rating node of the home network the total call tariff on the basis of the received foreign network's tariff portion and a call tariff or charge factor of the home network, and means for returning said total call tariff to the charging function of the foreign network.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
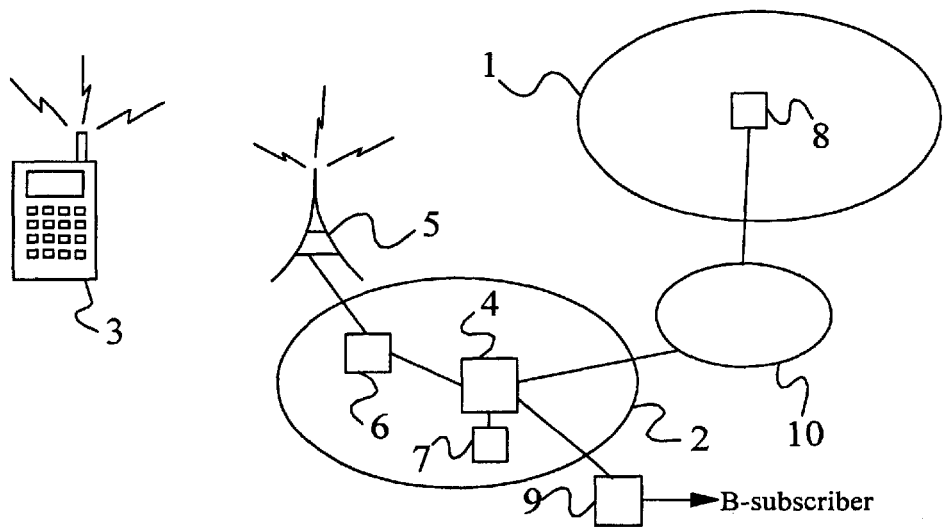
FIG. 1 illustrates schematically a telecommunication system.

There is illustrated in FIG. 1 a telecommunications system comprising a number of mobile telephone networks 1, 2. A first of the networks 1 is a mobile telephone network (e.g. using the GSM standard) and represents a home network (HPLMN) to which a notional mobile telephone user subscribes. The network 1 is therefore responsible for charging this notional subscriber either by way of issuing bills for previous calls made, or by debiting a prepaid account held by the subscriber.

FIG. 1 also shows a second mobile telephone network 2 and a Mobile Station 3 owned by the notional subscriber (it is assumed that the subscriber has inserted his Subscriber Identity Module (SIM) card into the telephone). Assuming that the subscriber has left his HPLMN 1 and has roamed into the coverage area of the foreign network 2 (VPLMN), the Mobile Station 3 registers with a Mobile Switching Centre (MSC) of the VPLMN 2 using the information stored in the SIM card. Subsequently, in order to set up a call, the Mobile Station 3 makes contact with the MSC 4 of the VPLMN via a Base Station 5 and a Base Station Controller 6. The MSC 4 of the VPLMN network is referred to as the Visited MSC (VMSC). The VMSC 4 controls the routing of a call from the Mobile Station 3 to a called B-number (or B-subscriber) and in addition implements a Service Switching Function (SSF) 7. The function of the SSF 7 is to collect charging information during a call and to relay this information to a charging node (not shown) of the HPLMN 1 following termination of the call (charging information may also be sent to the HPLMN and or to the Mobile Station during a call). The VPLMN's SSF 7 maintains the call tariffs applied by the foreign network 2 for a variety of calls, e.g. local, national, and international (alternatively the SSF 7 may obtain these from a rating node of the VPLMN).

A "rating node" 8 (also referred to as the Charging Control Node (CCN)) is provided in the subscriber's HPLMN 1 and maintains details of the tariffs of the HPLMN operator. Typically, the HPLMN has a single rating node 8 centrally located within the HPLMN 1. The rating node 8 maintains a database containing formulae for computing tariffs of the home network 1. In addition, the rating node 8 implements the functionality of an SCF in order to allow the CCN to exchange tariffs and tariff related information with SSFs.

When the Mobile Station 3 initiates a call, the MSC 4 of the VPLMN sets up the call connection to the dialled B-number via a Gateway MSC (GMSC) 9. In addition, the SSF 7 identifies the tariff $t_1$ upon which the foreign network 2 will base its charge. The SSF 7 then sends to the SCF running at the home network's rating node 8, via an SS7 signalling network 10 (or some other network such as an IP based network), a request for the total call tariff which the subscriber's HPLMN 1 will apply to the call initiated by the Mobile Station 3. This request includes both the dialled B-number in addition to the call tariff $t_1$ of the VPLMN 2. At the HPLMN's rating node 8, a total tariff $t_2$ is computed based on the tariff $t_1$ (and possibly the dialled B-number). Assuming for example that the HPLMN determines from the B-number and the current location of the subscriber that it will levy an administrative fee of 5% over and above the call tariff of the VPLMN, as well as a 22% VAT element. The HPLMN will multiply the VPLMN's tariff $t_1$ by a factor of 1.27 to obtain the total tariff $t_2$. The SCF running at the rating node 8 then returns the total tariff $t_2$ to the SSF 7 of the VMSC 4 in an appropriate message. This message, and the total tariff enquiry message, may be sent in GSM networks using the CAMEL mechanism (CAMEL Application Protocol CAP) or the INAP protocol.

After the SSF 7 of the VMSC 4 has received the total call tariff $t_2$, the call connection between the Mobile Station 3 and the called B-subscriber is completed. As already noted, the call tariff $t_2$ may be used either to provide real time Advice of Charge to the subscriber, where the cost incurred so far (or total cost) is displayed on a display of the subscriber's Mobile Station 3, or to debit a prepaid account of the subscriber. In the latter case, the subscriber's HPLMN 1 may forward to the SSF 7 of the VMSC 4, together with the total call tariff $t_2$, such information as is necessary to allow VMSC 4 to monitor in real time the connected time or charge incurred by the party using Mobile Station 3 and to provide relevant feedback information to the Cost Control Node 8 residing in HPLMN 1. This allows the accurate debiting of the subscriber's prepaid account.

The CAMEL mechanism mentioned above allows for the sending of Charge Advice Information elements from any service running in a network to the Mobile Station 3. In the "third" phase of the CAMEL mechanism, it is proposed to allow the invocation on behalf of the VPLMN Operator of CAMEL-based Operator-Specific Services. These services shall always be invoked after the invocation of subscriber-specific services. These subscriber-specific services provide such features as post-paid real-time charging with cost control or pre-paid real-time charging to the subscriber. The subscriber services are always run in the HPLMN.

Figure 2:
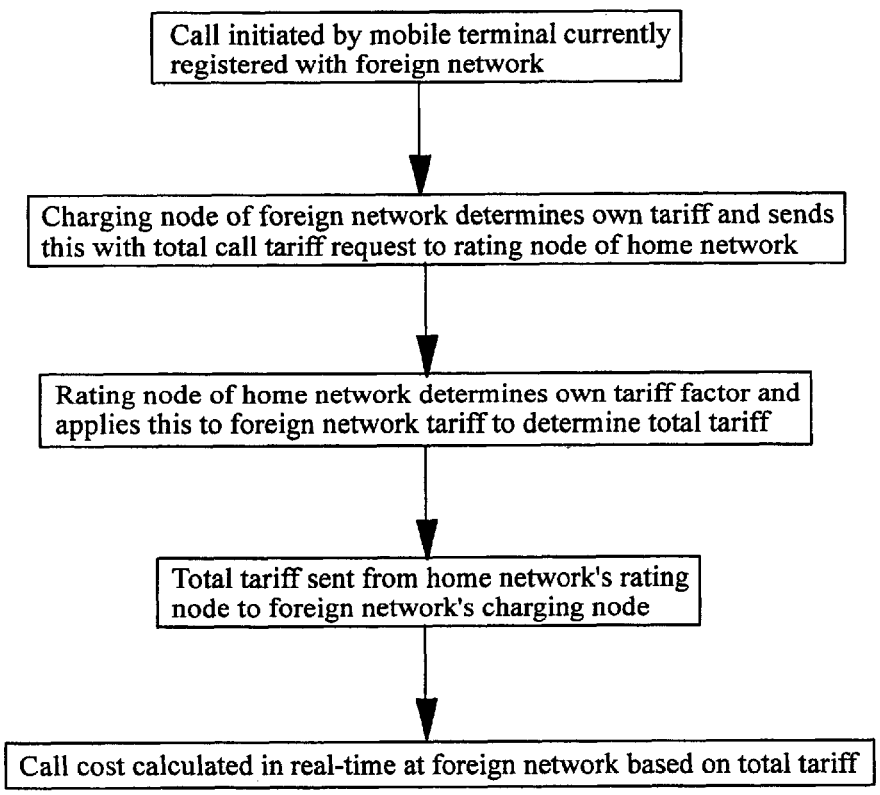
FIG. 2 is a flow diagram illustrating a caller tariff determination method used in the system of FIG. 1.
Figure 3:
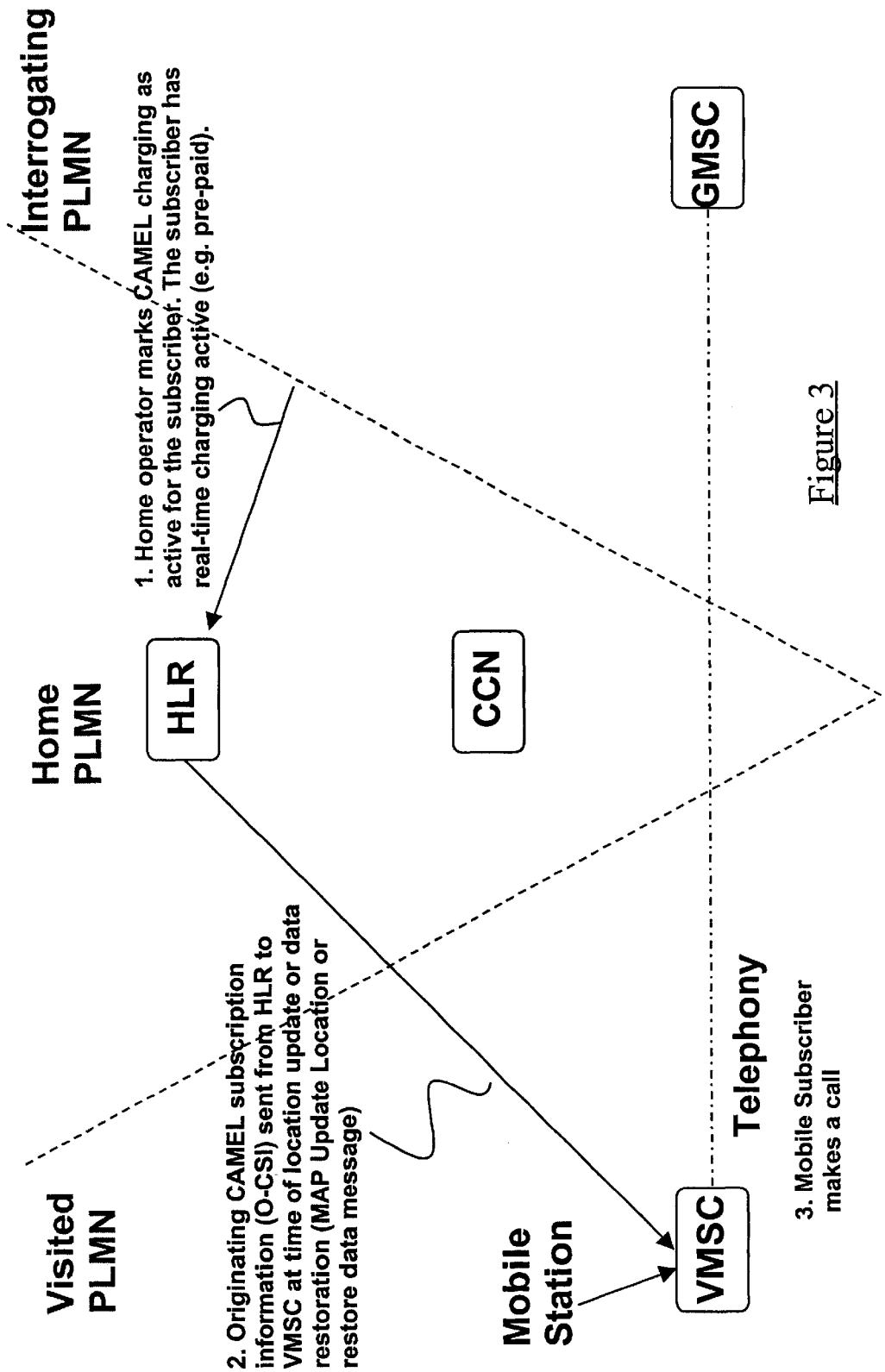
FIGS. 3 to 6 illustrate schematically a detailed implementation of the caller tariff determination method of FIG. 2.
Figure 4:
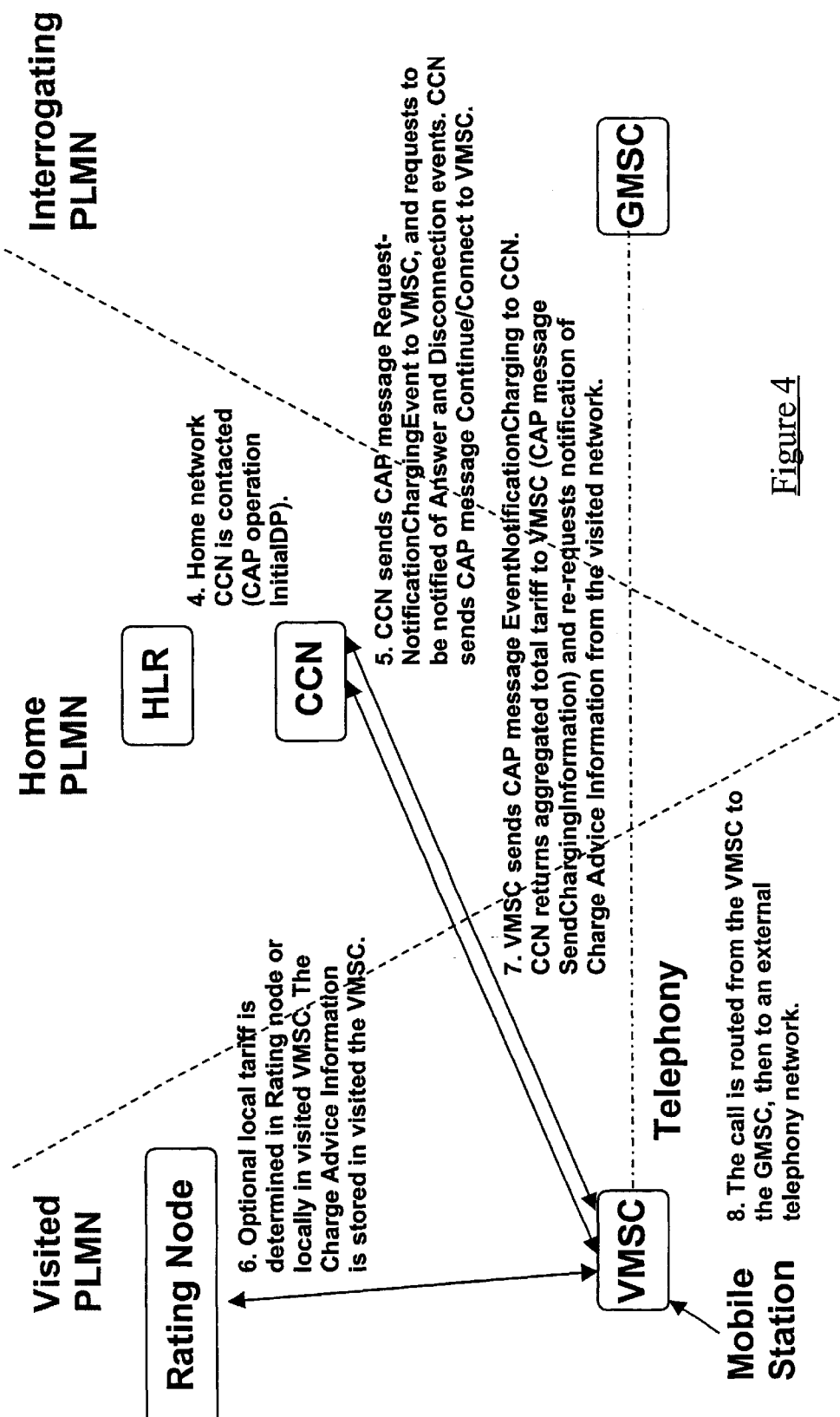
Figure 5:
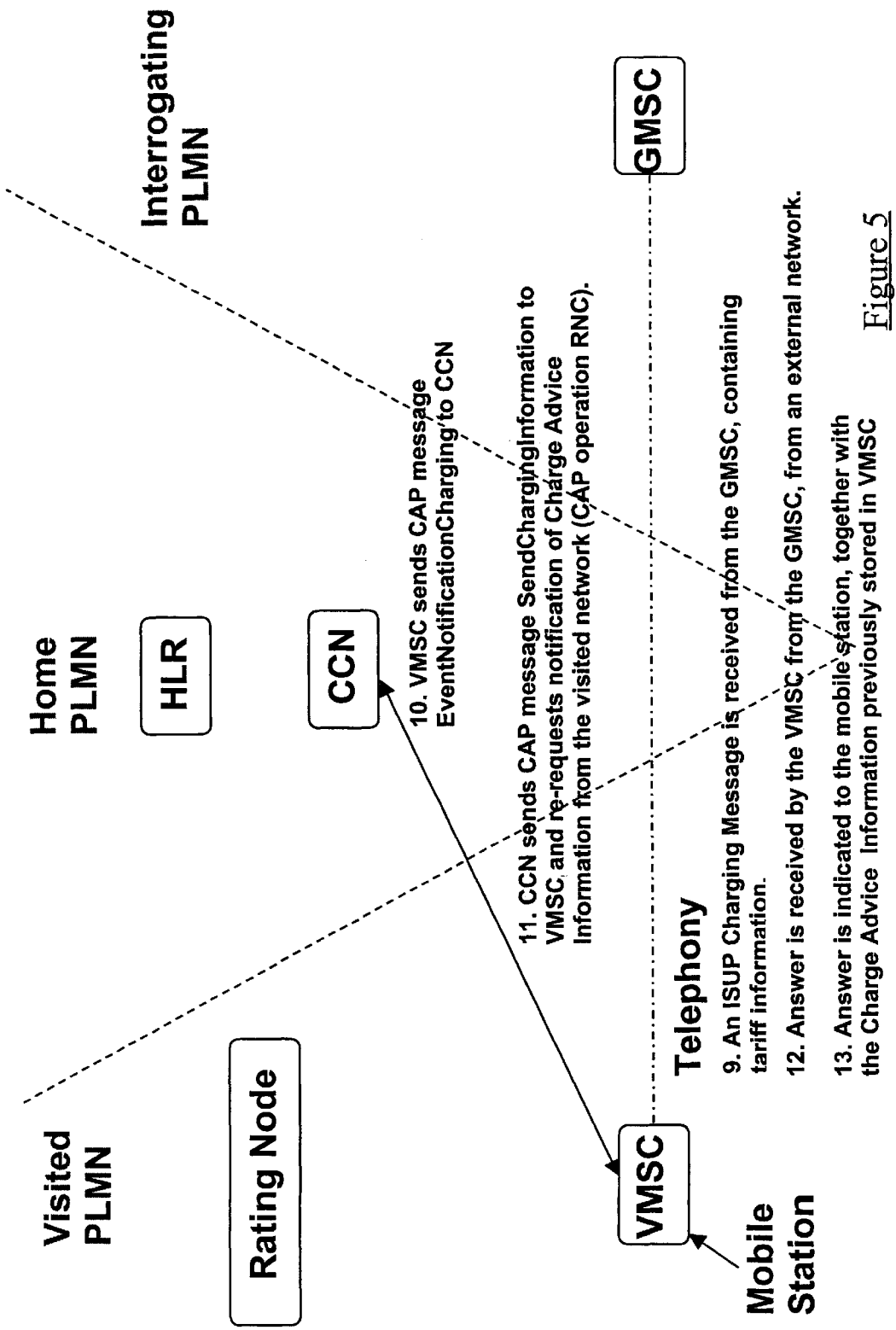
Figure 6:
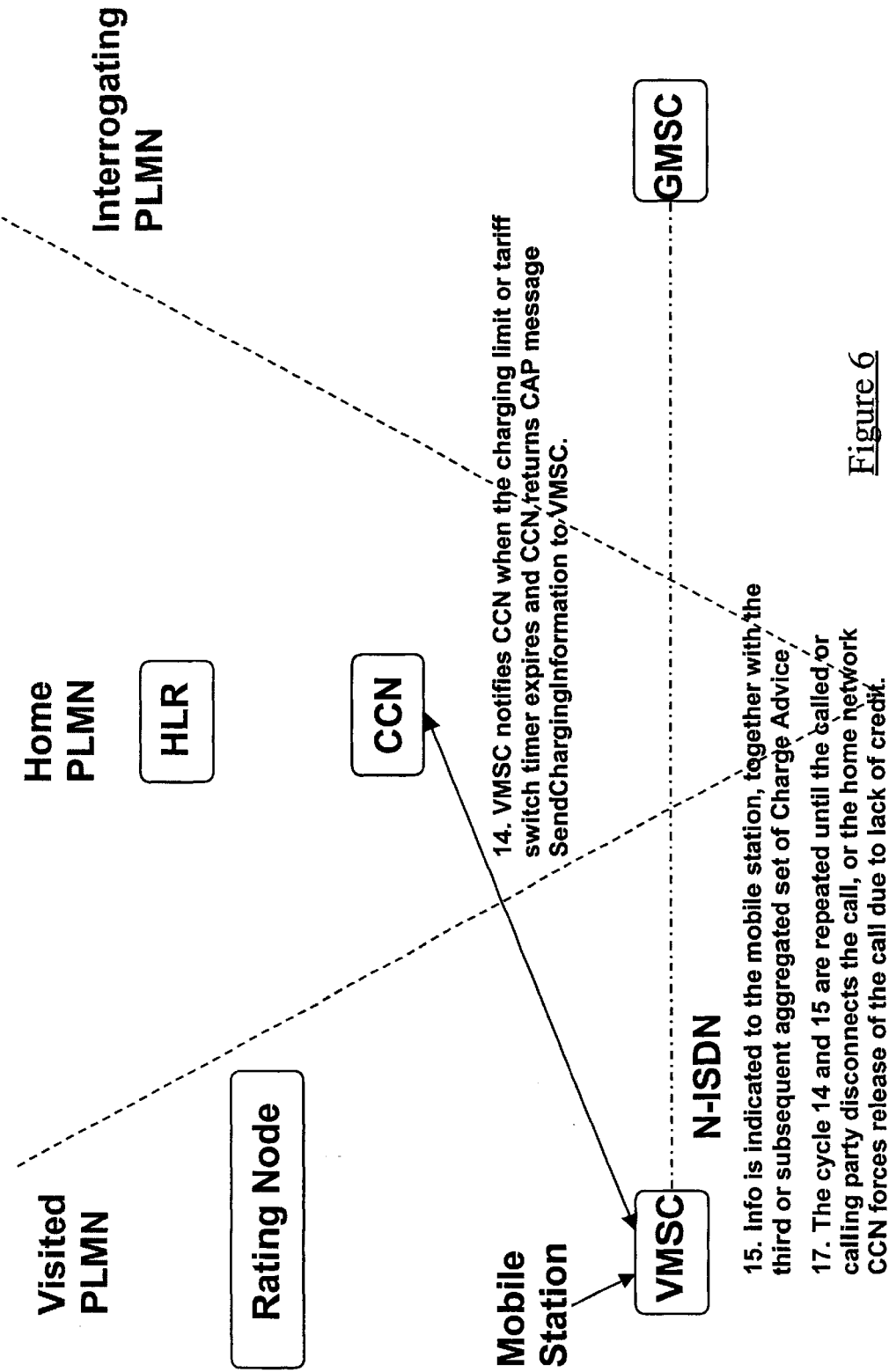

The issue arises therefore of how to indicate to a pre- or post-paid subscriber (who is provisioned with the Advice Of Charge service) the correct aggregate tariff when services invoked in the HPLMN are run in combination with services running in the VPLMN, e.g. VPLMN number translation services. In addition to this issue, there arises the question of how events occurring in the VPLMN can be relayed to the service executing in the HPLMN rating node in a manner such that the CAMEL mechanism used does not have to be expanded when new chargeable events are defined in UMTS or GSM. There is currently no mechanism in the state of the art that allows tariff information received by the VPLMN from another external network to be relayed to the rating node in the HPLMN. Furthermore, it is not possible to relay standard GSM or UMTS charging information from the VPLMN to the HPLMN rating node in a manner that is understood by both networks, but that does not need the carrier protocol (CAMEL) to be expanded for every set of new data carried. These issues are addressed by the method described above in general terms with reference to FIGS. 1 and 2.

FIGS. 3 to 6 illustrate in more detail the internetwork signalling involved in tariff determination. It is proposed to use existing and new CAMEL Application Part (CAP) protocol to transfer tariff information between the serving network (VPLMN) and a centralised Rating Node (CCN) in the home network (HPLMN) in accordance with the following steps:

1) The operator of the HPLMN marks CAMEL charging as active for the subscriber in question, in the Home Location Register (HLR).
2) During a Location Update or Data Restoration process (MAP Update Location or Restore Data operations), the HPLMN HLR sends the originating CAMEL subscription information (O-CSI) to the VMSC/SSF of the VPLMN.
3) The subscriber initiates a call, e.g. by dialling the number of a B-subscriber.
4) The VMSC contacts the CCN of the HPLMN (using the CAP operation InitialDP), and the CCN returns a tariff (Charge Advice Information elements) to the enquiring VMSC/SSF (CAP operation SendChargingInformation). For cost control purposes CAP operation ApplyCharging is invoked by the CCN.
5) The CCN then sends a request to the VMSC/SSF that the VMSC/SSF notify the CCN of locally determined tariffs, or of tariffs received from external sources (new CAP operation RequestNotificationChargingEvent). The CCN also requests to be notified of Answer and Disconnection events, and instructs the VMSC/SSF to continue the call (CAP operation Continue/Connect).
6) The call is routed from the VMSC to the GMSC, and then to the external telephony network.
7) At reception of ACM, the VMSC/SSF contacts a rating node (CCN) of the VPLMN to obtain the local tariff to be applied by the VPLMN.
8) The local tariff information is passed to the HPLMN CCN. The CCN calculates an aggregated tariff and sends this back to the VMSC/SSF together with a charging limit (new CAP operation EventNotificationCharging and existing CAP operations SendChargingInformation and ApplyCharging). The aggregated tariff is a combination of the locally determined tariff/external tariff and the tariff generated by the CCN (as described above). The aggregated tariff and charging limit are stored in the visited VMSC (replacing the previously stored tariff).

9–11) In the event that the VMSC/SSF receives external charging information prior to receiving an Answer message (ANM) from the called B-subscriber (e.g. such charging information may be contained in a CHG message routed via the GMSC), step 8 may be repeated (as steps 10 and 11). However, repetition is optional and in most call cases will not occur (thus avoiding additional signalling between networks).

12–13) At reception of the Answer message (ANM) by the visited VMSC, the latest tariff information (Charge Advice Information elements according to GSM 02.24), which is already stored and available in the visited VMSC/SSF, is relayed to the calling party Mobile Station and the correct price information is displayed on the Station's display.

14) When a charging limit or tariff switch timer expires, this is indicated to the CCN in the HPLMN (CAP operation ApplyChargingReport) which returns a new charging limit and a new aggregated tariff (CAP operations ApplyCharging and SendChargingInformation) to the VMSC/SSF.

15) The received information is relayed by the VMSC/SSF to the Mobile Station.

18) Steps 14 and 15 are repeated at intervals until the call is released. Any call related events that have an impact on charging will be reported according to steps 10 and 11.

The mechanism described above (steps 1 to 18) has the advantage that the required aggregate tariff is available at the VMSC/SSF when the Answer message is received from the B-subscriber. The parties may be connected immediately, and there is no requirement for a delay whilst the appropriate tariff is determined.

It will be appreciated by the person of skill in the art that various modifications may be made to the above described embodiment without departing from the scope of the present invention. For example, the aggregate tariff may be determined only upon receipt of the Answer message at the VMSC/SSF. However, this will result in a possible delay as mentioned above.

What is claimed is:

1. A method of determining a total call tariff in respect of a call from a Mobile Station currently registered with a foreign network, the method comprising the steps of:

receiving a request to initiate a call connection from said mobile station towards a particular called party number;

sending a total call tariff request from a charging function of the foreign network to a rating node of the mobile telephone subscriber's home network, said message including a foreign call tariff portion of the foreign network associated with establishing said call connection and wherein said called party number is further provided to said home network;

at the rating node, determining said total call tariff on the basis of the foreign call tariff portion and a home call tariff portion of the home network;

receiving the determined total call tariff at the charging function of the foreign network; and applying the received total call tariff on said initiated call connection for said mobile station by said foreign network.

2. A method according to claim 1, wherein the sending of subsequent call tariff requests is triggered by receipt at the foreign network of external charging information.

3. A method according to claim 1, wherein the determined call tariff is available at the charging function of the foreign network when an Answer Message (ANM) is received at the foreign network.

4. A method according to claim 1, wherein the charging function of the foreign network is a Service Switching Function (SSF).

5. A method according to claim 4, wherein the SSF is at least one of implemented in and in communication with the Mobile Switching Center (MSC) serving the Mobile Station (MS).

6. A method according to claim 1, wherein the rating node of the home network is a Charging Control Node.

7. A method according to claim 1, the method being implemented using the CAMEL mechanism.

8. A method according to claim 1, wherein said home call tariff of the home network relates to at least one of subscribed services, subscribed dialed services, and charging services.

9. A method according to claim 1 and comprising sending a credit limit from the rating node to the charging function, wherein, when the charge accumulated by the Mobile Station reaches said limit, the rating node must seek a further authorization from the rating node.

10. Apparatus for determining a total call tariff in respect of a call from a mobile telephone subscriber registered with a foreign network, said mobile telephone subscriber associated with a home network, the apparatus comprising means for receiving a request to initiate a call connection between said mobile telephone subscriber and a particular directory number;

means for sending a total call tariff request from a charging function of the foreign network to a rating node of the mobile telephone subscriber's home network, the message including a foreign call tariff portion of the foreign network associated with establishing said call connection and wherein said particular directory number is also provided to said home network, means for determining at a rating node of the home network the total call tariff on the basis of the received foreign call tariff portion and a home call tariff of the home network, means for receiving said total call tariff by the charging function of the foreign network;

means for applying the received total call tariff on said initiated call connection by said foreign network.

11. An apparatus according to claim 10, wherein the means for sending of subsequent call tariff requests is triggered by receipt at the foreign network of external charging information.

12. An apparatus according to claim 10, wherein the charging function of the foreign network is a Service Switching Function (SSF).

13. An apparatus according to claim 10, wherein the rating node of the home network is a Charging Control Node.

14. An apparatus according to claim 10, wherein said home call tariff of the home network relates to at least one of subscribed services, subscribed dialed services, and charging services.

* * * * *